US008398525B2

(12) United States Patent  
Matsuoka et al.

(10) Patent No.: US 8,398,525 B2
(45) Date of Patent: Mar. 19, 2013

(54) PLANETARY GEAR REDUCTION SYSTEM

(75) Inventors: Tetsuya Matsuoka, Kobe (JP); Hiroyasu Nishikawa, Kobe (JP); Tooru Nishida, Akashi (JP); Hirofumi Akahori, Akashi (JP); Hideyuki Imai, Akashi (JP); Tatsuhiko Goi, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 149 days.

(21) Appl. No.: 12/915,405

(22) Filed: Oct. 29, 2010

(65) Prior Publication Data

US 2011/0105270 A1 May 5, 2011

(30) Foreign Application Priority Data

Oct. 30, 2009 (JP) ................................. 2009-249695

(51) Int. Cl.
*F16H 57/08* (2006.01)
(52) U.S. Cl. ........................................................ 475/331
(58) Field of Classification Search .................... 475/331
See application file for complete search history.

(56) References Cited

U.S. PATENT DOCUMENTS

| 3,939,736 | A * | 2/1976 | Morin ........................... 475/338 |
| 5,466,198 | A | 11/1995 | McKibbin et al. |
| 2004/0147361 | A1 | 7/2004 | Yasuda et al. |
| 2005/0192152 | A1 * | 9/2005 | Kimes ........................... 475/331 |
| 2007/0238575 | A1 * | 10/2007 | Wang et al. .................... 475/331 |
| 2011/0009233 | A1 * | 1/2011 | Mizuno et al. ................ 475/331 |

FOREIGN PATENT DOCUMENTS

| JP | U-01-121747 | 8/1989 |
| JP | A-06-101750 | 4/1994 |
| JP | A-2004-211803 | 7/2004 |

OTHER PUBLICATIONS

Extended Search Report issued in corresponding European Application No. 10188918.6 dated Feb. 18, 2011.
Office Action issued in Japanese Patent Application No. 2009-249695 dated Sep. 6, 2011 (with translation).

* cited by examiner

*Primary Examiner* — David D Le
*Assistant Examiner* — David J Hlavka
(74) *Attorney, Agent, or Firm* — Oliff & Berridge, PLC

(57) ABSTRACT

A planetary gear reduction system has a sun gear, a plurality of planet gears, a ring gear, and a planet carrier. The planet carrier has a first plate supporting one ends of planet shafts supporting the planet gears, a second plate supporting the other ends of the planet shafts, and a cylindrical drum connecting the first and second plates. The first plate has first portions supporting the one ends of the planet shafts; second portions connecting the first plate to the drum, the first and second portions being provided alternately in a circumferential direction; first cutouts each defined between the neighboring first and second portions, the first cutouts each extending radially inwardly from a circumferential edge thereof to a position adjacent a circle passing centers of the planet shafts; and second cutouts each defined radially inward of the second portion and between the neighboring two first portions, the second cutouts each extending radially inwardly from a first region outside the circle and a second region inside the circle.

5 Claims, 5 Drawing Sheets

PLANETARY GEAR REDUCTION SYSTEM

FIELD OF THE INVENTION

The present invention relates to a planetary gear reduction system for use in particular in a drive force transmission mechanism of an aircraft.

BACKGROUND OF THE INVENTION

A conventional planetary gear reduction system has a sun gear having external teeth, a plurality of planet gears each having external teeth in meshing engagement with the external teeth of the sun gear, a common planet carrier supporting journal shafts of the planet gears for establishing relative positions of the planet gears, and a ring gear having internal teeth in meshing engagement with external teeth of the planet gears. With the arrangement, the drive force generated at the drive source such as a gas turbine engine is transmitted to the sun gear and then to the planet gears. The drive force transmitted to the planet gears are outputted in two different ways, for example, in the form of rotational force of the ring gear which is caused by the rotational motions of the planet gears and in the form of another rotational force of the planet carrier which is caused by orbital motions of the planet gears relative to the sun gear. See U.S. Pat. No. 5,466,198, for example.

In operation of the aircraft equipped with the planetary gear reduction system, the journal shafts of the planet gears tend to deflect or skew circumferentially due to torque forces applied to the planet carrier. This may cause the journal shafts of the planet gears out of parallel to the axis of the sun gear, which in turn results in that the planet gears make improper engagements with the sun gear and the ring gear and the journals of the planet gears become unevenly supported by their bearings. Eventually, the life of the planetary gear reduction system is reduced.

Therefore, it is an object of the present invention to provide a planetary gear reduction system which is capable of effectively restricting or minimizing the deflections of the journal shafts of the planet gears and thereby extending a life span of the system.

SUMMARY OF THE INVENTION

To achieve this, the planetary gear reduction system comprises
a sun gear having external teeth;
a plurality of planet gears each having external teeth engaged with the external teeth of the sun gear;
a ring gear having internal teeth engaged with the external teeth of the planet gears; and
a planet carrier having a first plate supporting one ends of planet shafts supporting the planet gears, a second plate supporting the other ends of the planet shafts, and a cylindrical drum connecting the first and second plates.

In particular, the present invention is featured in that the first plate has
first portions supporting the one ends of the planet shafts;
second portions connecting the first plate to the drum, the first and second portions being provided alternately in a circumferential direction;
first cutouts each defined between the neighboring first and second portions, the first cutouts each extending radially inwardly from a circumferential edge thereof to a position adjacent a circle passing centers of the planet shafts; and
second cutouts each defined radially inward of the second portion and between the neighboring two first portions, the second cutouts each extending radially inwardly from a first region outside the circle and a second region inside the circle.

According to the invention, the rigidity of the first plate is reduced relative to the second plate by means of the first and second cutouts provided around the first portions, which effectively minimizes circumferential deflections of the planet shafts and the non-parallelisms of the planet shafts relative to the central axis of the system to retain suitable engagements between the planet and the sun gears and also the planet and the ring gears. Also, the life spa of the system is increased. Further, the cutouts reduces the total weight of the system.

In another aspect of the invention, the each of the second cutouts has a first cutout portion extending radially inwardly from the first region and a pair of second cutout portions extending radially inwardly from a radially inward end of the first cutout portion and diverging in opposite circumferential directions toward neighboring first portions, respectively. This arrangement effectively reduces the rigidity of the portions around the support portion while keeping a structural strength needed for the first plate.

In another aspect of the invention, the each of the second cutouts extends 50 percent or more of an annular region in a radial direction. The annular region is a ring-like zone which crosses through internal cylindrical cavities of the planet shafts and is defined between a circumscribed circle which circumscribes the cylindrical cavities of the planet shafts and an inscribed circle which inscribes the cylindrical cavities. This arrangement effectively reduces the rigidity of the first plate.

In another aspect of the invention, the second portion is deviated relative to the first portion in a direction parallel to a central axis of the sun gear. This arrangement increases a distance between the first and second portions, which effectively reduces the rigidity of the first plate.

In another aspect of the invention, the first plate is made as a separate part of the planet carrier and is connected to the drum through the second portions thereof. This arrangement allows the planet carrier to reduce the rigidity of its first plate easily.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following descriptions of the preferred embodiments are merely exemplary in nature and are in no way intended to limit the invention, its application, or uses.

Hereinafter, preferred embodiments of the present invention will be described with reference to the accompanying drawings. Although not limited thereto, the planetary gear reduction system according to the present invention is preferably used with, for example, gas turbine engines.

Figure 1:
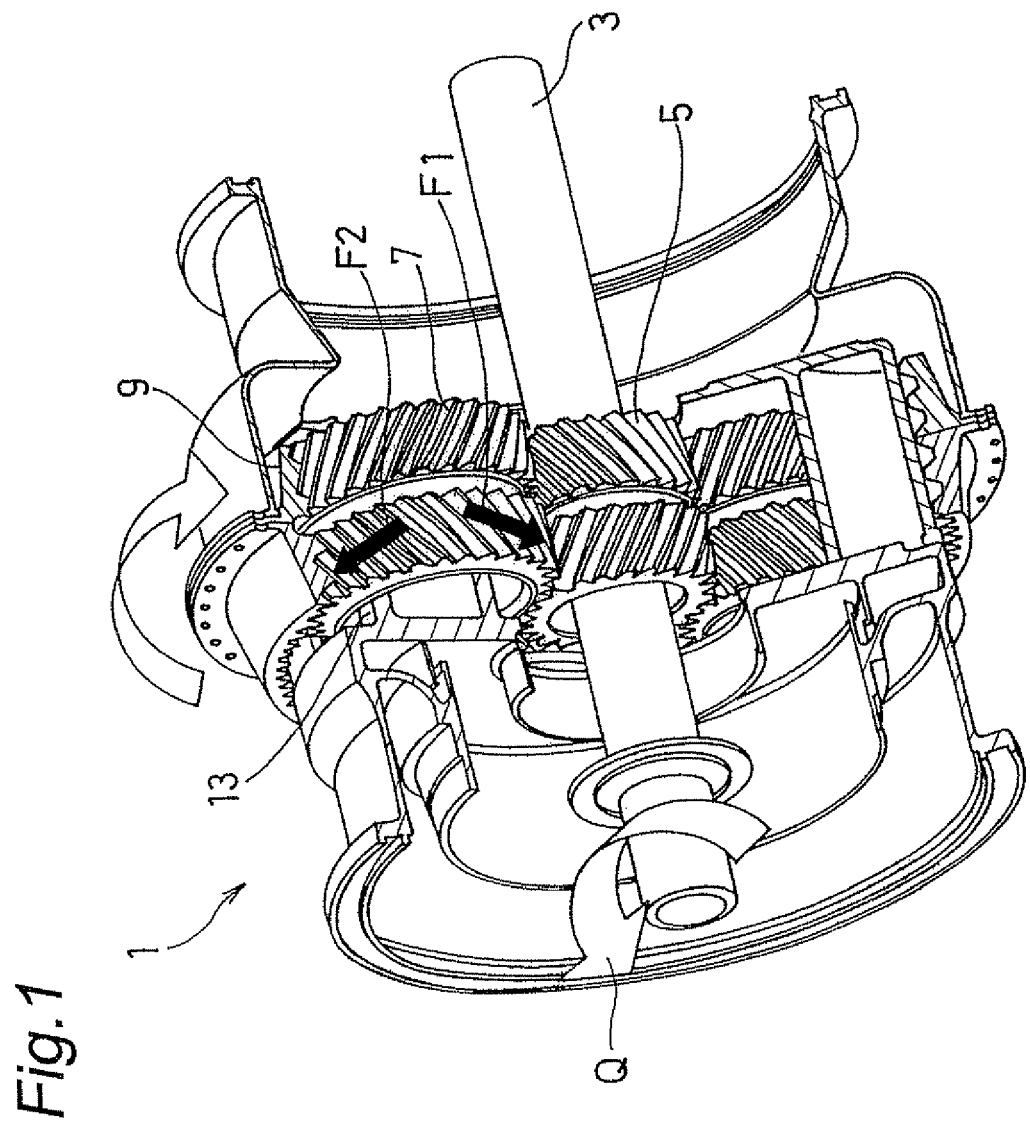
FIG. 1 is a partial broken-away perspective view of an embodiment of a planetary gear reduction system according to the invention.

With reference to the accompanying drawings, preferred embodiments according to the present invention will be described below. FIG. 1 is a perspective view of a planetary gear reduction system, generally indicated by reference numeral 1, according to the present invention. The planetary gear reduction system 1 may be used with an engine of the aircraft and helicopter. In this instance, the system 1 is drivingly connected to the gas turbine engine through an input shaft 3 so that the driving force from the engine is transmitted to two independent rotors not shown. Although not shown, the gas turbine engine is typically provided on the left side of FIG. 1 (hereinafter the left side is referred to as "front" or "forward" side and the opposite right side is referred to as "rear" or "rearward" side.)

Figure 2:
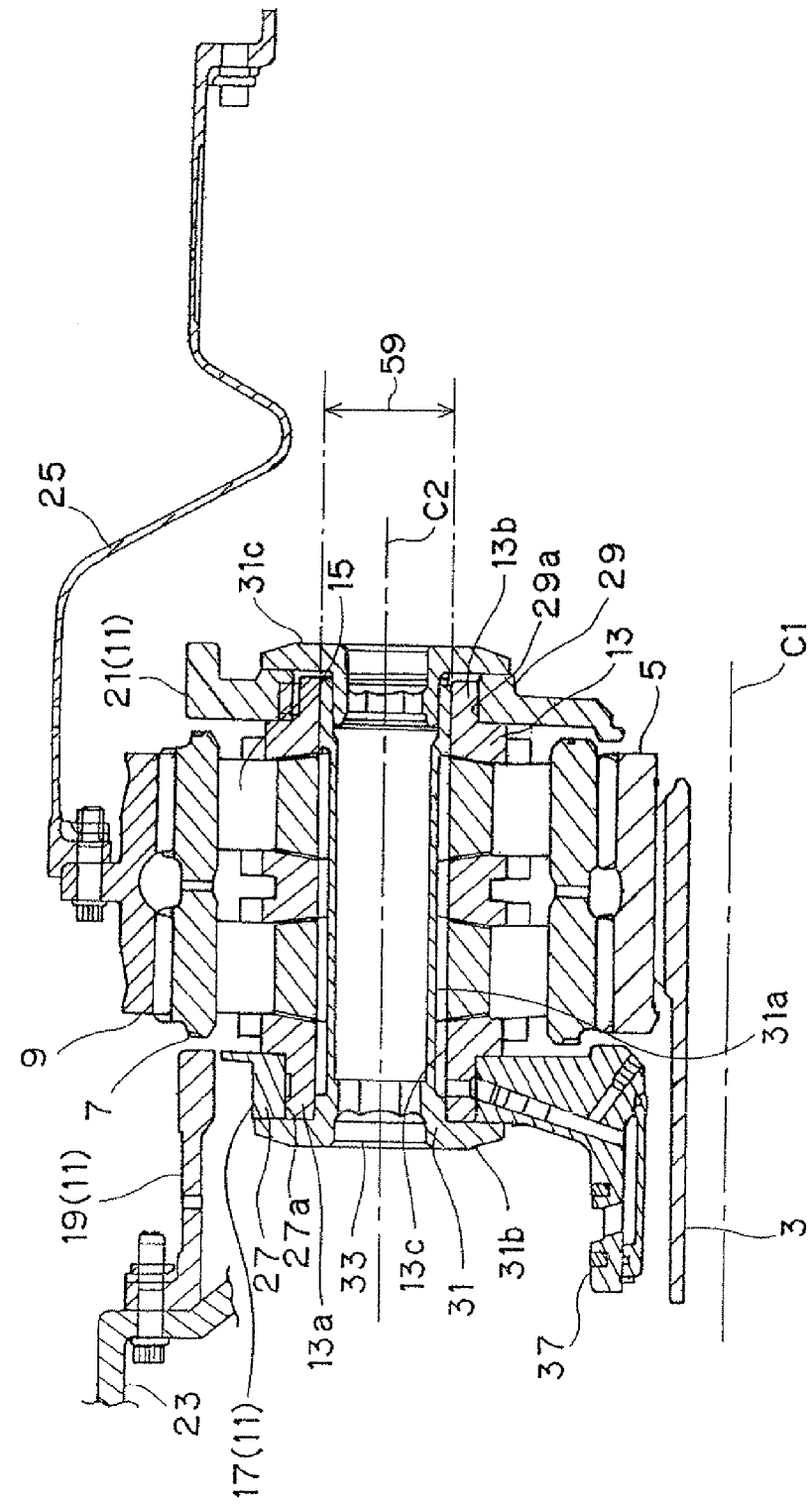
FIG. 2 is a longitudinal, partial cross sectional view of the planetary gear reduction system shown in FIG. 1.

FIG. 2 is a partial cross sectional view of the planetary gear reduction system 1, along a longitudinal axis of the input shaft 3. As shown in the drawing, the planetary gear reduction system 1, which is preferably designed as a double gear mechanism, has a sun gear 5, a plurality of planet gears 7, a ring gear 9, a planet carrier 11, and a plurality of planet shafts 13. The sun gear 5, which has a double helical gear formed with external teeth slanting in different directions, is secured on the input shaft 3. Each of the planet gears 7, which has a double helical gear formed with external teeth designed to engage with the sun gear 5, is secured on the rotational shaft or associated planet shaft 13 in the form of a hollow cylinder through a double row bearing 15, for rotation about a central axis C2 of the planet shaft 13. In the exemplary embodiment, as described below, five planets gears 7 are provided at regular circumferential intervals around the sun gear 5. The ring gear 9, which has a double helical gear formed with internal teeth, is assembled to engage with the five planet gears 7.

Figure 3:
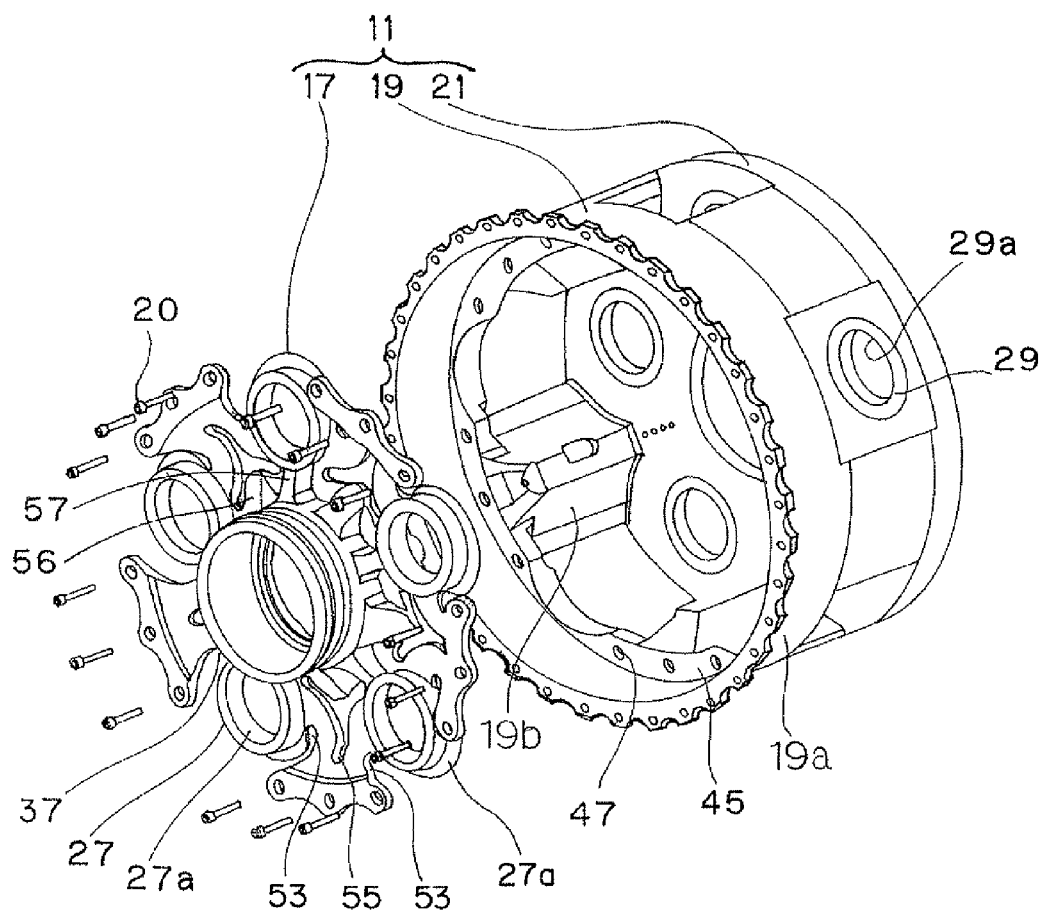
FIG. 3 is an exploded perspective view of the planet carrier incorporated in the planetary gear reduction system shown in FIG. 1.

Each of the planet shafts 13 for the planet gears 7 are supported at its front end by a circular front plate 17 in the form of disk having a central axis C1 aligned with the central axis C1 of the input shaft 3. As shown in the exploded perspective view in FIG. 3, the front plate 17 is mounted and secured through bolts 20 on the internal surface of the cylindrical drum 19 positioned coaxially therewith. The drum 19 has a front, hollow cylindrical portion 19a and a plurality of columns 19b integrally formed with the cylindrical portion 19a and extending rearwardly from the cylindrical portion 19a. In the exemplary embodiment, the columns 19b each having substantially a trapezoidal cross section tapering radially inwardly toward the central axis C1 are positioned at regular circumferential intervals and between the planet shafts 13 (see FIG. 2). The rear ends of the columns 19b carry a rear plate 21 formed integrally therewith for supporting the rear ends of the planet shafts 13 as shown in FIG. 2. As described above, the drum 19, the front plate 17, and the rear plate 21 cooperate with each other to form the planet carrier 11 which determines relative positions of the planet shafts 13 and also the planet gears 7.

The drum 19 are connected at its front end through bolts to a forward output shaft 23 positioned coaxially with the input shaft 3 so that the orbital movements around the central axis C1 of five planet gears 7 is transmitted to a forward rotor (not shown) through the drum 19 and the forward output shaft 23. The ring gear 9 is connected at its peripheral portion to a flexible support 25 positioned coaxially with the input shaft 3 so that the rotational force of the planet gears 7 rotating about respective central axes C2 are transmitted to a rearward rotor (not shown) through the ring gear 9 and the flexible support 25. Although the ring gear 9 and planet carrier 11 rotate in the exemplary embodiments, either may be supported unrotatably so that the rotational force is transmitted forwardly or rearwardly only.

Each of the planet shafts 13 has a smaller diameter portion 13a integrally formed therewith at its front end peripheral portion. Correspondingly, peripheral portions of the front plate 17 have support portions 27. Each of the support portions 27 has a through-hole 27a formed therewith for supporting the planet shaft 13, in particular the smaller diameter portion 13a thereof. This allows that the front-end smaller diameter portions 13a of the planet shafts 13 are securely fitted in respective through-holes 27a. Likewise, rear-end smaller diameter portions 13b formed at the rearward ends of the planet shafts 13 are securely fitted in respective through-holes 29a formed in respective support portions 29 of the rear plate 21. Preferably, the front plate 17, the planet shafts 13, and rear plate 21 are fastened to each other in the axial direction by the use of suitable means such as fixing shafts 31.

Preferably, each of the fixing shafts 31 has a hollow cylindrical portion 31a, a front-end enlarged diameter head 31b which is larger in outer diameter than the cylindrical portion 31a and formed integrally at the front end of the cylindrical portion 31a, and a rear-end enlarged diameter head 31c which has a disk-like portion larger in outer diameter than the cylindrical portion and a cylindrical portion integrally formed with the disk-like portion and designed to be securely fitted in the rear end of the cylindrical portion 31a. This allows that, when assembling, the cylindrical portions 31a of the shafts 31 are inserted though the through-holes 13c of the planet shafts 13 from the front ends thereof until the front-end enlarged diameter heads 31b abut associated front portions of the planet shafts 13 and the front plate 17. Then, the rear-end enlarged diameter heads 31c are securely connected to the rear ends of the cylindrical portions 31a. Forcing the front- and rear-end enlarged diameter heads 31b and 31c to each other causes the rear-end enlarged diameter heads 31c to abut associated rear end portions of the planet shafts 13 and the rear plate 21, which allows the planet shafts 13 to be stably supported by the front and rear plates, 17 and 21.

Figure 4:
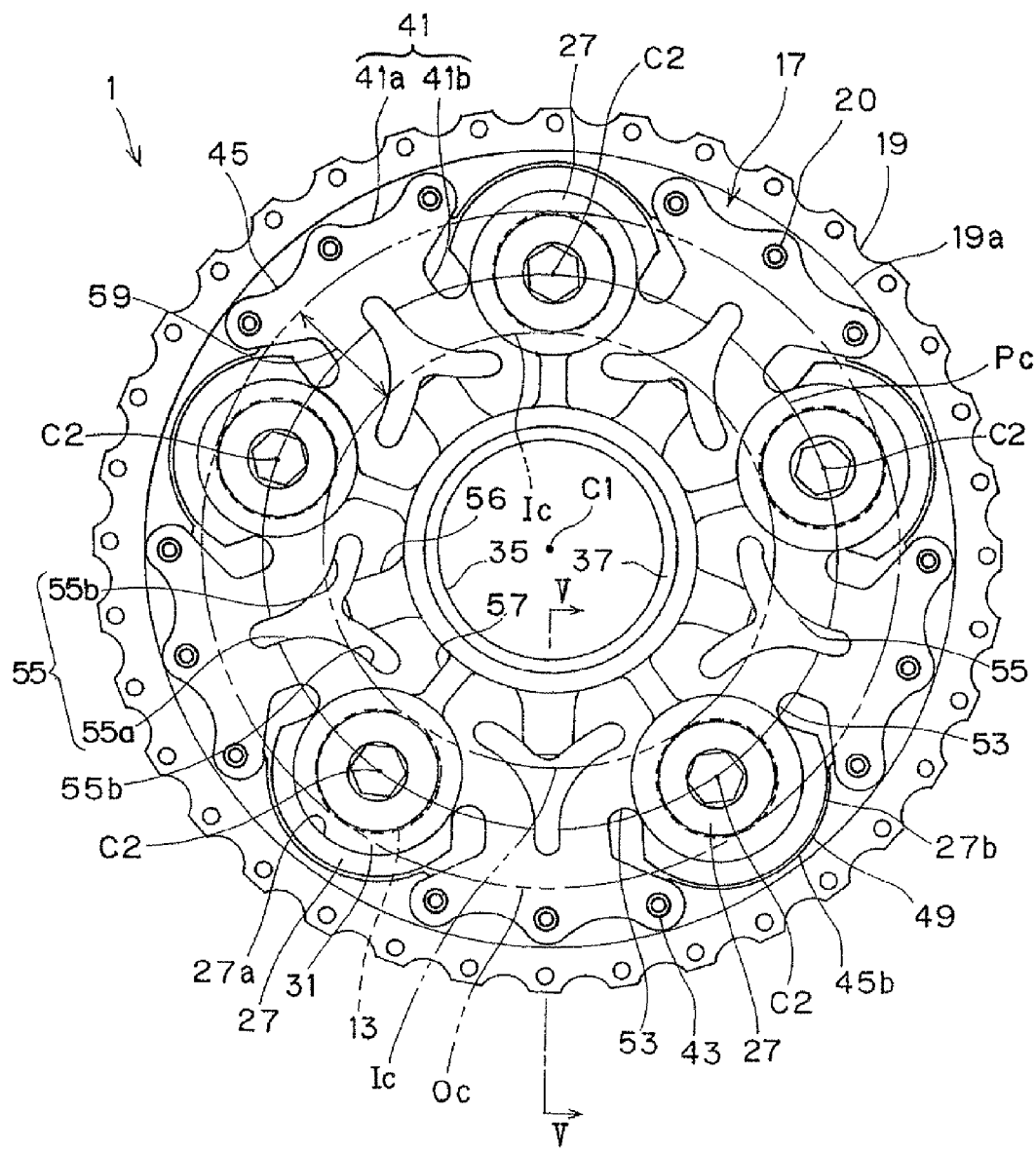
FIG. 4 is a front view of the planet carrier incorporated in the planetary gear reduction system shown in FIG. 1.

FIG. 4 is a front view of the front plate 17 of the planetary gear reduction system 1. As shown in the drawing, the disk-like front plate 17 has at its center a central boss 37 formed integrally therewith. The central boss 37 defines a through-hole into which the input shaft 3 is inserted. In particular, the front plate 17, in particular, an annular plate portion extending around and radially outwardly from the central boss 37, has various cutouts defined therein to reduce its rigidity to a certain extent. Preferably, the front plate 17 has an outer diameter which is substantially the same as the inner diameter of the cylindrical portion 19a of the drum 19.

Figure 5:
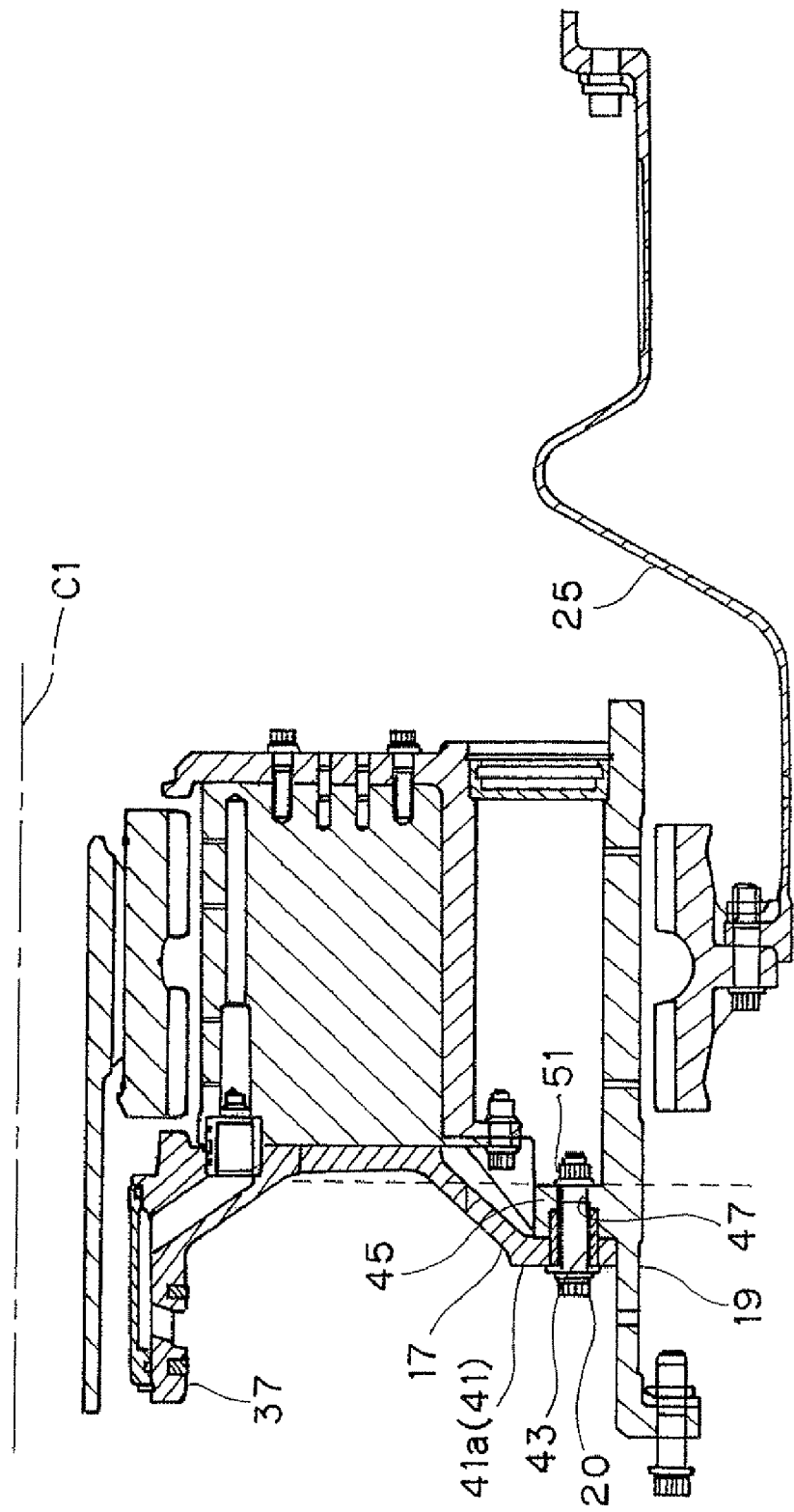
FIG. 5 is a longitudinal, partial cross sectional view taken along lines V-V in FIG. 4.

Discussions will be made in detail to the configuration of the front plate 17. In the exemplary embodiment, the front plate 17 has a plurality of connection leaves 41 for the connections between the front plate 17 and the drum 19. The connection leaves 41 have five outward connecting portions 41a provided at regular circumferential intervals around the central axis C1 and five inward connecting arms 41b for connecting between the connecting portions 41a and the support portions 27. In the exemplary embodiment, each connecting portion 41a has a plurality of holes (e.g., three in the embodiment in FIG. 4) 43, for the connection bolts, provided at regular circumferential intervals. Correspondingly, as shown in FIG. 5 which is a cross sectional view taken along lines V-V in FIG. 4, the cylindrical portion 19a of the drum 19 has an inner connecting portion 45 defined in the form of projected flange and running circumferentially on the inner surface of the drum, in which a plurality of through-holes extending in the directions substantially parallel to the central axis C1 are formed. This allows that the front plate 17 is firmly connected to the drum 19 simply by inserting bolts 20 into the through holes 43 of the front plate 17 and the through-holes 47 of the drum 19 and then turning associated nuts 51 on the bolts 20.

As shown in FIG. 4, the support portions 27 for supporting the forward ends of the planet shafts 13 are provided at intermediate portions between the circumferentially neighboring connecting portions 41a, namely, the connecting portions 41a and the same number of support portions 27 are positioned alternately at regular intervals in the circumferential direction. Preferably, the circumferential portions of the support portions 27 have arch-like circumferential edges 27b extending around the planet shafts 13 so that the circumferential edges 27b are placed within associated arch-like cutouts defined in the inner connecting portions 45 of the drum 19 in an opposed fashion to leave curved-gaps 49 defined therebetween. Although the connecting portions 41a may be provided radially outside the support portions 27, the above-described configuration of this embodiment effectively reduces the rigidity of the portions of the front plate 17 including the support portions 27.

The circumferential portion of the front plate has a plurality of cutouts 53, provided on opposite sides thereof in the circumferential direction and each extending from the circumferential edge toward the central axis C1 to reach or extend beyond a circle Pc connecting the central axes C2 of the planet shafts 13. For example, the cutouts 53 extend, between opposite ends of the circumferential edges 27b positioned adjacent the arch-like gaps 49 and the connecting leaves 41, from the circumferential edge of the front plate 17 toward the central axis C1 to terminate in the vicinity of the circle Pc.

Another cutouts 55 are provided at portions of the front plate 17, radially inward of the connecting portions 41a and between each neighborhood support portions 27, so that they extend radially from a region outside the circle Pc into a region inside the circle Pc. Preferably, each cutout 55 has a radial slot portion 55a extending radially inwardly from a portion adjacent the connecting portions 41a and a pair of slanted slot portions 55b diverging inwardly in opposite circumferential directions from the radially innermost end of the radial slot portion 55a toward the neighborhood support portions 27, which results in the pair of arms 41b located on opposite sides of each cutout 55 and curved radially outwardly from portions slightly inside the circle Pc toward the connecting portions 41a. The unique configuration of the cutouts 55 effectively reduces rigidities of the front plate portions around the support portions 27 while securing a whole strength necessary for the front plate 17.

Preferably, the front plate 17 has first reinforcing ridges or ribs 56 each extending radially outwardly from the central boss 37 to an intermediate portion of the diverging slots 55b and second reinforcing ridges or ribs 57 each extending radially outwardly from the central boss 37 to the support portion 27.

Preferably, at least a part of each cutout 55 resides in an annular region 59 of the front plate 17. The annular region 59 is a ring-like zone which crosses through cylindrical interiors or cavities of five hollow cylindrical planet shafts 13 and is defined between a circumscribed circle Oc which circumscribes the cylindrical cavities of the planet shafts 13 and an inscribed circle Ic which inscribes the cylindrical cavities. The cutouts 55 extend 50 percent or more, more preferably 70 percent or more, of the annular region in the radial direction, which effectively reduces the rigidities of the portions between the support portions 27.

Also, as shown in FIG. 5, the connecting portions 41a are deviated forward relative to the support portions 27 of which positions in the axial direction are indicated by dotted line. Although the connecting portions 41a may be provided substantially on a cross sectional plane on which the supporting portions 27 reside, the deviated arrangement of the connecting portions relative to the supporting portions in the axial direction increases a distance and, as a result, length of moment arm between the neighborhood connecting and supporting portions, which effectively reduces the rigidity of the front plate 17.

The above-described planetary gear reduction system 1 provides following advantages. Specifically, in operation of the helicopter in which the planetary gear reduction system 1 is incorporated, the input shaft 3 rotates in the direction indicated by arrow Q. This results in that the rotational force transmitted from the sun gear 5 to each planet gear 7 at the engagement portion thereof orients in the direction indicated by arrow F1. Also, the rotational force transmitted from the planet gear 7 to the ring gear 9 orients in the direction indicated by arrow F2. F1 and F2 have the same circumferential component of force, which may act to deflect the planet shafts 13 and, as a result, the planet carrier. The deflection of the planet carrier results in that the planet shafts become skewed or non-parallel relative to the axes of the sung gear and the ring gear. According to the invention, however, the rigidities of the front frame portions adjacent the support portions 27 supporting the planet shafts 13 are effectively reduced by the formations of the cutouts 53 and 55 provided therein and, instead, flexibilities are provided thereto.

This results in that the deflections of the planet shafts 13 are reduced and the non-parallelism of the planet shafts 13 relative to the central axis C1 is kept the minimum, which still ensures suitable engagements between the planet gears 7 and the sun gear 5 and the ring gear 9 and, therefore, extends a life span of the planetary gear reduction system 1. Additionally, the formation of the cutouts reduces the weight of the system 1. Above all, those advantages are provided economically with a minimum structural modification.

The description of the invention is merely exemplary in nature and, thus, variations that do not depart from the gist of the invention are intended to be within the scope of the invention. Such variations are not to be regarded as a departure from the spirit and scope of the invention.

PARTS LIST

1: planetary gear reduction system
5: sun gear 7: planet gear
9: ring gear 11: planet carrier
13: planet shaft 17: front plate
19: drum 21: rear plate
27: support portion 41: connecting portion
53, 55: cutout Pc: circle

What is claimed is:
1. A planetary gear reduction system, comprising
a sun gear having external teeth;
a plurality of planet gears each having external teeth that engage with the external teeth of the sun gear;
a ring gear having internal teeth that engage with the external teeth of the planet gears; and
a planet carrier having a first plate that supports first ends of planet shafts supporting the planet gears, a second plate that supports second ends of the planet shafts, and a cylindrical drum connecting the first and second plates;

wherein the first plate includes:
  first portions that support the first ends of the planet shafts;
  second portions that connect the first plate to the drum, the second portions being located adjacent to the first portions in a circumferential direction, and the first and second portions being provided alternately in the circumferential direction;
  first cutouts, each of the first cutouts defined between each of the adjacent first and second portions, the first cutouts each extending radially inwardly from a circumferential edge of the first plate to a position adjacent a circle that connects central axes of the planet shafts, wherein each of the first cutouts partially defines the shape of the adjacent first and second portions; and
  second cutouts, each defined radially inward of the second portion and between consecutive first portions, the second cutouts each extending radially inwardly from a first region outside the circle into a second region inside the circle.

2. The system of claim 1, wherein each of the second cutouts has a first cutout portion extending radially inwardly from the first region and a pair of second cutout portions extending radially inwardly from a radially inward end of the first cutout portion and diverging in opposite circumferential directions toward consecutive first portions, respectively.

3. The system of claim 1, wherein each of the second cutouts extends 50 percent or more of an annular region in a radial direction, the annular region being a ring-like zone which crosses through internal cylindrical cavities of the planet shafts and is defined between a circumscribed circle which circumscribes the cylindrical cavities of the planet shafts and an inscribed circle which inscribes the cylindrical cavities.

4. The system of claim 1, wherein the second portion is deviated relative to the first portion in a direction parallel to a central axis of the sun gear.

5. The system of claim 1, wherein the first plate is made as a separate part of the planet carrier and is connected to the drum through the second portions thereof.

* * * * *